No. 643,031. Patented Feb. 6, 1900.
J. ARN.
SPRING TIRE.
(Application filed May 27, 1899.)
(No Model.)
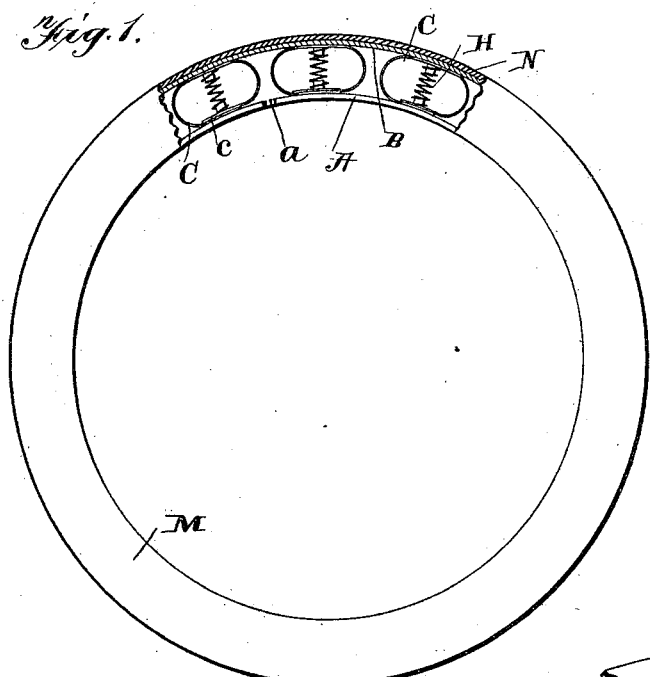
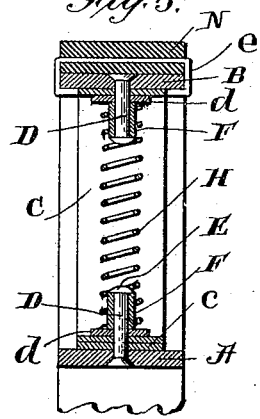
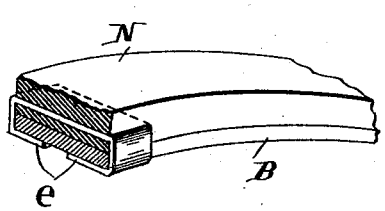
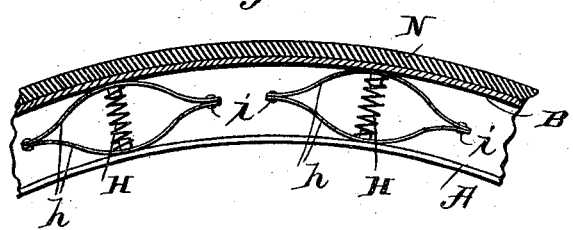
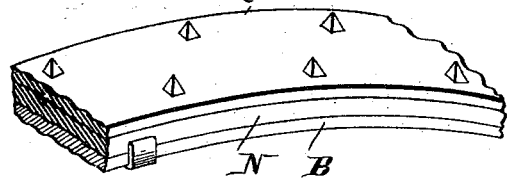
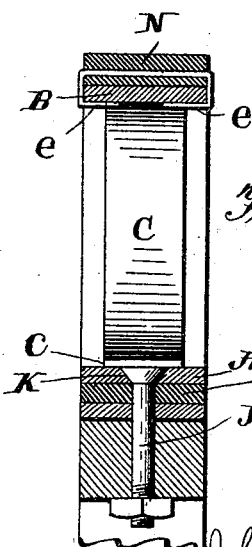
Witnesses
Geo. E. Frech.
Chas. A. Wright Jr.
Inventor
John Arn,
by A. S. Pattison,
Attorney

UNITED STATES PATENT OFFICE.

JOHN ARN, OF COLUMBUS, OHIO.

SPRING-TIRE.

SPECIFICATION forming part of Letters Patent No. 643,031, dated February 6, 1900.

Application filed May 27, 1899. Serial No. 718,573. (No model.)

*To all whom it may concern:*

Be it known that I, JOHN ARN, a citizen of the United States, residing at Columbus, in the county of Franklin and State of Ohio, have invented new and useful Improvements in Spring-Tires, of which the following is a specification.

My invention relates to improvements in spring-tires, and pertains to a tire comprising an inner ring adapted to be fitted to an ordinary vehicle-wheel, an outer concentric ring or band, and intermediate spiral and flat springs, all of which will be fully described hereinafter and particularly pointed out in the claims.

The object of my invention is to provide a metallic spring-tire constructed and adapted to be fitted to wheels of vehicles of all styles and to have the inner ring or band expansible and contractible to fit wheels which vary in their diameters.

In the accompanying drawings, Figure 1 is a side elevation of a wheel embodying my invention, showing a covering for the spring and a covering partly broken away to expose the spring to view. Fig. 2 is a view showing a modification in the construction of the flat or elliptic spring. Fig. 3 is an enlarged sectional view taken on the line 3 3 of Fig. 1. Fig. 4 is a detached perspective view of a portion of the outer rubber band and showing the clips for attaching it to the outer ring or band of the tire. Fig. 5 is a view showing a spur-band which may be attached to the tire when it is desired to use it upon ice. Fig. 6 is a sectional view of a portion of a wheel, showing my tire attached thereto.

Referring now to the drawings, A indicates an inner circular band or ring formed of flat spring metal and having a transverse cut portion *a* forming ends for the said band, whereby it can be adjusted longitudinally for varying its diameter and adapting it for connection with wheels which vary slightly in their diameter.

Arranged concentric with the inner band or ring A is an outer band or ring B, formed of material similar to that of the inner band. Situated at intervals between the inner and outer rings or bands are the oval or elliptical shaped flat springs C, which are formed, preferably, as illustrated in Fig. 1, of a single piece of flat spring metal. The ends of these oval flat springs are brought together and lapped one over the other, as illustrated at the point *c*, and passing through the lapped ends of the springs and the adjacent ring or band is a rivet D, having an inner head E, and clamped between the head of this rivet and the inner side of the elliptical or flat spring are the sleeves F, which form studs for the reception of the adjacent ends of the spiral springs H. Also, preferably, situated between the inner ends of these sleeves and the said oval springs are washers *d*, and the opposite sides of the oval springs are likewise clamped by similar rivets, washers, and sleeves to the other band. I here show the ends of these springs lapped over and clamped to the inner ring or band A, though this construction may be reversed, as will be readily understood.

The ends of the spiral springs fit tightly the sleeves or studs, and thus the rivets and the sleeves, which hold in position the oval or flat springs, also serve the function of holding the spiral springs in position. These spiral springs can be readily attached and detached as necessity may require by simply contracting the springs and placing the ends over the studs formed by the said sleeves and the rivets holding the sleeves.

The inner ring or band is attached to the tire or felly of a wheel by means of the attaching-bolts J, which pass through apertures K, formed in the inner band at a point intermediate and between the oval or elliptical springs. If desired, (though this is not necessary,) a rubber band or packing L may be placed between the inner band or ring and the periphery of the wheel, as illustrated in Fig. 6, which in some instances may be desirable.

For the purpose of covering the springs and hiding them from view I provide an elastic or non-elastic flexible material or covering M, which may have its inner and outer edges clamped, respectively, between the inner band and the periphery of the wheel and between the outer tire N and the outer ring or band, though this flexible cover may be applied or attached in any other desired manner.

For the purpose of making the wheel noiseless I provide an outer rubber, rawhide, or band formed of other similar material, like that illustrated at N, and this band is provided with inwardly-extending lips or ears e, which grasp opposite edges of the outer band or ring, as illustrated.

When it is desired to use this tire upon vehicles which are run upon the ice, an additional outer ring or band Q is provided, which may be attached to the outer rubber tire or directly to the outer ring or band by means of lips in the same manner as that shown for connecting the rubber band to the outer ring.

By means of the above construction I produce a spring-tire which is simple, cheap, and effective in construction and which is capable of being readily repaired and also capable of being readily attached to and detached from ordinary vehicle-wheels—such as bicycles, carriages, wagons, &c.—and the strength of the spiral and the flat or oval springs will depend upon the service to which the tire is to be subjected—that is to say, will be made of a strength according to the load they are expected to carry.

In Fig. 2 I illustrate a modification in respect to the construction of the elliptic or oval springs, which consists in forming the springs of two separate pieces h, with their ends riveted together, as shown at i, and these springs will be connected to the inner and outer rings or bands in the same manner as that shown and described in respect to the single-piece oval springs illustrated in Fig. 1.

Having thus described my invention, what I claim, and desire to secure by Letters Patent, is—

1. A spring-tire comprising concentric inner and outer bands, elliptic or oval springs situated between the said bands, oppositely-extending securing-rivets passing through said bands and springs and projecting therein, and sleeves surrounding the inner projecting ends of the rivets and situated between the springs and the inner ends of the rivets, and attachable and detachable spiral springs having their ends surrounding respectively the said sleeves, substantially as described.

2. A spring-tire comprising inner and outer concentric bands, oval or elliptical springs situated between and engaging the said bands, securing-rivets passing through both of said bands and springs, the inner ends of the rivets projecting in opposite directions within said springs forming short oppositely-projecting studs, and detachable spiral springs having their ends surrounding said studs, whereby the studs serve as a means for uniting the oval or elliptical springs to the bands and for holding the spiral springs in position, substantially as described.

In testimony whereof I have hereunto set my hand in the presence of two subscribing witnesses.

JOHN ARN.

Witnesses:
C. HERMAN,
F. A. SIEGEL.